United States Patent
Azad

(10) Patent No.: US 10,669,498 B1
(45) Date of Patent: Jun. 2, 2020

(54) MOS2- OR WS2-FILLED HOLLOW ZNS HEXAGONAL NANOTUBES AS CORE-SHELL STRUCTURED SOLID LUBRICANTS AND LUBRICANT MODIFIERS FOR SPACE MECHANISMS

(71) Applicant: United States of America as Represented by the Administrator of NASA, Washington, DC (US)

(72) Inventor: Abdul-Majeed Azad, Monrovia, CA (US)

(73) Assignee: U.S.A. as Represented by the Administrator of the National Aeronautics and S pace Administration, Washington, DC (US)

( * ) Notice: Subject to any disclaimer, the term of this patent is extended or adjusted under 35 U.S.C. 154(b) by 277 days.

(21) Appl. No.: 15/619,690

(22) Filed: Jun. 12, 2017

(51) Int. Cl.
| | |
|---|---|
| *F16C 33/04* | (2006.01) |
| *C07F 5/04* | (2006.01) |
| *C10M 103/06* | (2006.01) |
| *C10M 169/04* | (2006.01) |
| *B82Y 30/00* | (2011.01) |
| *B82Y 40/00* | (2011.01) |

(52) U.S. Cl.
CPC ........... *C10M 103/06* (2013.01); *B82Y 30/00* (2013.01); *B82Y 40/00* (2013.01); *C10M 169/04* (2013.01); *C10M 2201/0623* (2013.01); *C10M 2201/0653* (2013.01)

(58) Field of Classification Search
CPC .. C10M 113/08; C10M 113/06; C10M 125/04

USPC .................................................. 508/108, 200
See application file for complete search history.

(56) References Cited

U.S. PATENT DOCUMENTS

| 8,646,977 B2 | 2/2014 | Adam |
| 9,316,298 B2 | 4/2016 | Yamane et al. |
| (Continued) | | |

FOREIGN PATENT DOCUMENTS

| CN | 10192249 B | 12/2010 |
| CN | 102839373 A | 12/2012 |
| WO | 2013171063 A1 | 11/2013 |

OTHER PUBLICATIONS

Edgars Butanovs et al., "Synthesis and Characterization of ZnO/ZnS/MoS2 Core-Shell Nanowires", found in the Journal of Crystal Growth and published on Nov. 26, 2016.

(Continued)

*Primary Examiner* — Prem C Singh
*Assistant Examiner* — Francis C Campanell

(57) ABSTRACT

A process for making solid lubricants or lubricant additives or lubricant modifiers may include synthesizing two-dimensional (2D) nanoplatelets, nanorods, or nanowires of $MoO_3$ and $WO_3$. The process may also include creating hollow hexagonal ZnO nanotubes by refluxing a mixture of zinc nitrate and urea at a predefined temperature or a range of temperatures for a predefined period or periods of time. The process may further include growing the hollow hexagonal ZnO nanotubes around platelets, nanorods, or nanowires of the $MoO_3$ or $WO_3$. The process may also include creating a solid lubricant in a core-shell configuration from the hollow hexagonal ZnS nanotubes with an embedded hexagonal core of $MoS_2$ or $WS_2$.

14 Claims, 6 Drawing Sheets

(56) References Cited

U.S. PATENT DOCUMENTS

| | | | |
|---|---|---|---|
| 2011/0206596 A1* | 8/2011 | Tenne | B82Y 30/00 |
| | | | 423/463 |
| 2012/0008887 A1 | 1/2012 | Adam | |
| 2015/0040697 A1 | 2/2015 | Yamane et al. | |
| 2015/0147012 A1 | 5/2015 | Scancarello | |
| 2016/0327089 A1 | 11/2016 | Adam et al. | |
| 2017/0005283 A1* | 1/2017 | Al-Ghamdi | H01L 51/4233 |

OTHER PUBLICATIONS

Dr. Junqing Hu et al., "Sn-Filled Single-Crystalline Wurtzite-type ZnS Nanotubes" found at http://onlinelibrary.wiley.com/doi/10.1002/anie.200454205/full, and accessed online on Mar. 29, 2017.

Malayil Gopaian Sibi et al., "Facile Synthesis of Hydrodynamic Solid Lubricant MoS2 from Molybdenum Trioxide Nanorods", published by Cambridge Core on Jul. 26, 2013.

* cited by examiner

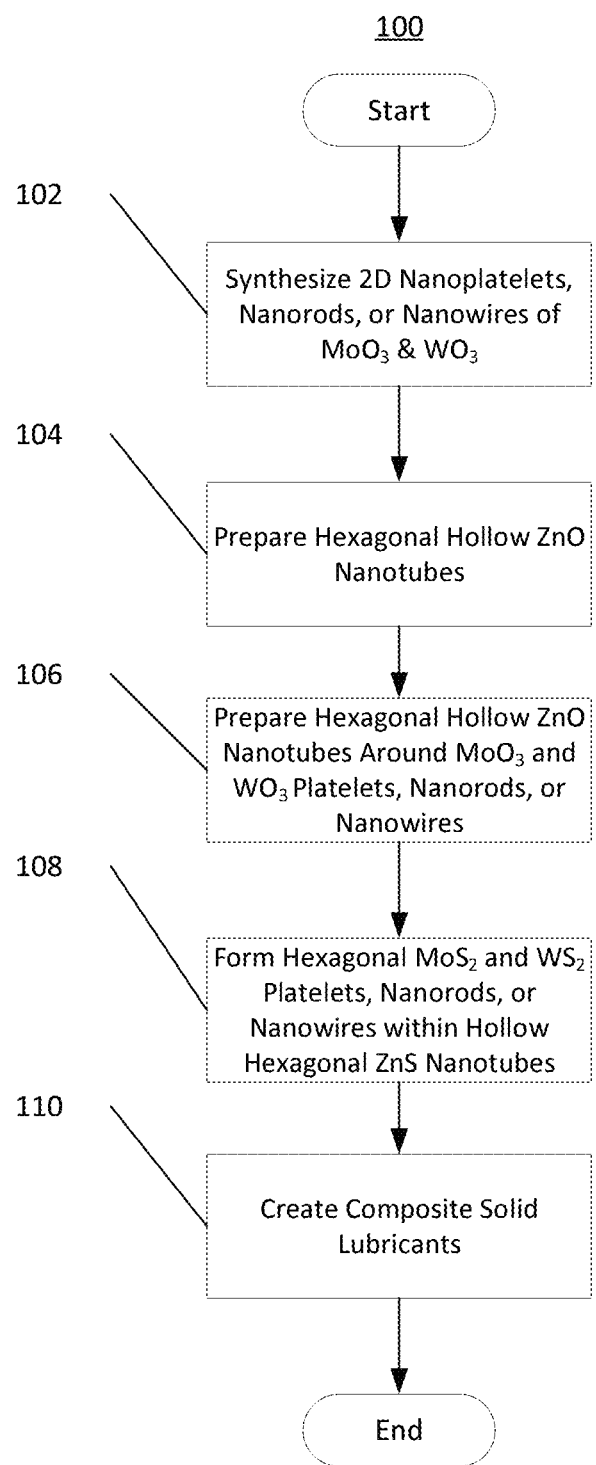

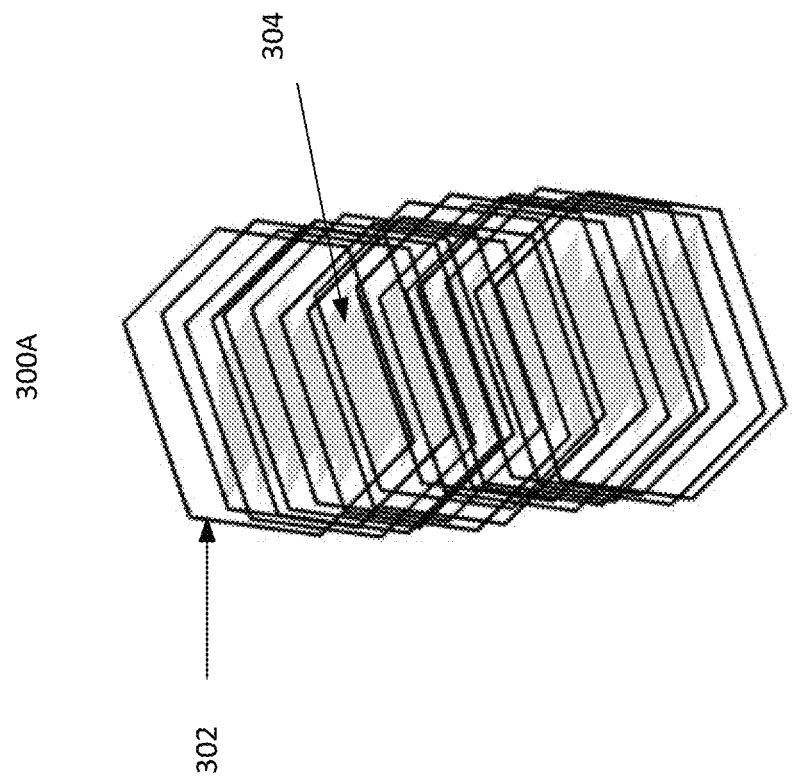

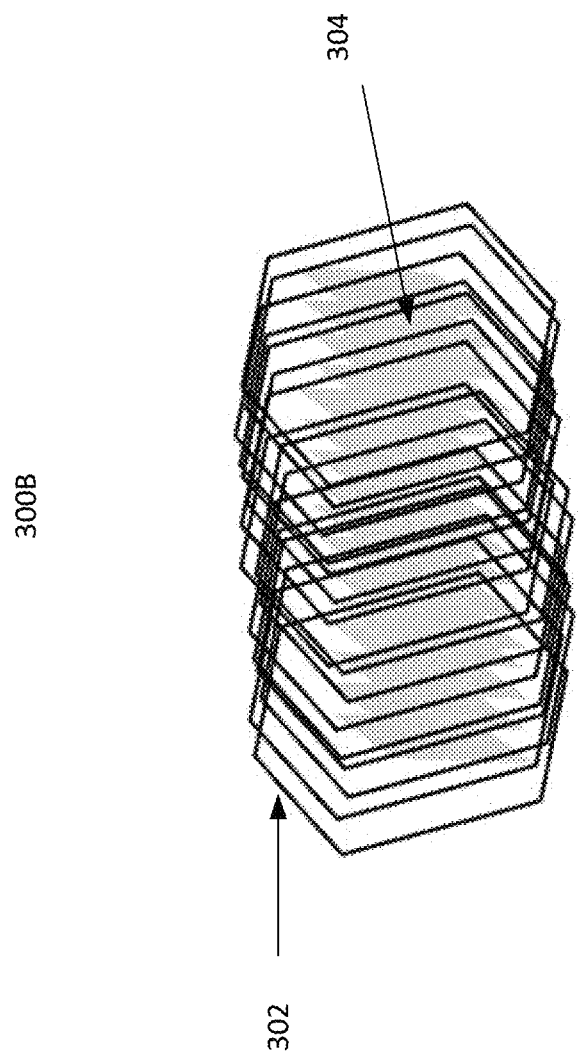

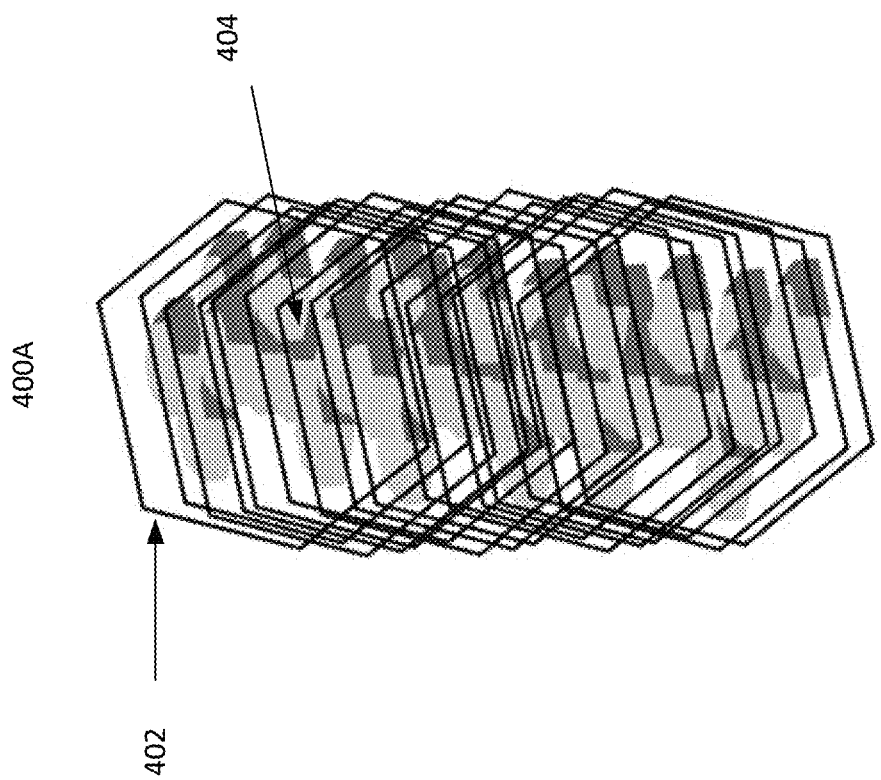

MOS2- OR WS2-FILLED HOLLOW ZNS HEXAGONAL NANOTUBES AS CORE-SHELL STRUCTURED SOLID LUBRICANTS AND LUBRICANT MODIFIERS FOR SPACE MECHANISMS

ORIGIN OF THE INVENTION

Embodiments of the present invention described herein were made in the performance of work under NASA contract NNNC12AA01C and are subject to the provisions of Public Law #96-517 (35 U.S.C. § 202) in which the Contractor has elected not to retain title.

FIELD

The present invention generally pertains to lubricants and lubricant modifiers for space mechanisms.

BACKGROUND

Ball-bearing assemblies are one of the most important parts to space mechanisms such as actuators, motors, gimbals, etc. For example, ball-bearing assemblies require proper lubrication so as to allow the assemblies to withstand the combined effect of abrasion, wear, and debris formation due to friction among constantly rubbing solid surfaces. The most important lubricant characteristic is the formation of protective surface films on the ball-bearings, that are endowed with the minimization of wear and surface damage. Surface chemistry of the bearings and raceways governs the film formation; physical properties of the lubricant dictate effectiveness of the film at minimizing wear.

Oils are preferred lubricants because of their lower drag torque; they establish a hydrodynamic film between balls and the raceway. This film is a mechanism by which the friction and wear are lowered. Even then, the integrity of lubricants against the rigors of tortuous motion in narrow paths over long periods is compromised. Various additives tend to improve the properties of oils for specific lubricating applications.

However, to ensure that the bearing assembly functions optimally over several decades in space can be a challenge. Thus, an alternative lubricant may be beneficial.

SUMMARY

Certain embodiments of the present invention may be implemented to provide solution to the problems and cater to the needs in the art that are outside the capabilities of conventional lubricants for ball-bearing assemblies. For instance, some embodiments generally pertain to a unique process of making $MoS_2$- or $WS_2$-filled hollow ZnS hexagonal nanotubes as solid lubricants or modifiers.

In an embodiment, a process for making solid lubricants may include synthesizing two-dimensional (2D) nanoplatelets, nanorods, or nanowires of $MoO_3$ and $WO_3$. The process may also include creating hollow hexagonal ZnS nanotubes by refluxing a mixture of zinc precursor (such as, zinc nitrate, zinc acetate, or zinc sulfate) and, a reductant (such as, urea, hexamethylenetetramine (HMTA) or oxalic acid) at a predefined temperature or a range of temperatures for a predefined period or periods of time. The process may further include growing the hollow hexagonal ZnS nanotubes around platelets, nanorods, or nanowires of the $MoO_3$ or $WO_3$. The process may also include creating a solid lubricant in a core-shell configuration from the hollow hexagonal shell of ZnS nanotubes with an embedded hexagonal core of $MoS_2$ or $WS_2$.

In another embodiment, a process for creating solid lubricants may include synthesizing two-dimensional (2D) nanoplatelets, nanorods, or nanowires of $MoO_3$ and $WO_3$. The process may also include preparing pristine 3D hexagonal hollow ZnO nanotubes around the 2D $MoO_3$ and $WO_3$ nanoplatelets, nanorods, or nanowires. The process may further include performing sulfidation of ZnO nanotubes and $MoO_3$ and $WO_3$ nanoplatelets, nanorods, or nanowires under mild condition by way of vapor phase transport to form hexagonal $MoS_2$, $WS_2$, or both, as platelets, nanorods, or nanowires, embedded within hollow hexagonal ZnS nanotubes. The process may also include creating an intended solid lubricant in a core-shell configuration from the hexagonal $MoS_2$, $WS_2$, or both, platelets, nanorods, or nanowires, embedded within the hollow hexagonal ZnS nanotubes.

BRIEF DESCRIPTION OF THE DRAWINGS

In order that the advantages of certain embodiments of the invention will be readily understood to those skilled in the art, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 1 is a flow diagram illustrating a process for creating solid lubricants for space mechanisms, according to an embodiment of the present invention.

FIGS. 3A-B are illustrative schematics of a composite of hollow ZnO nanotubes and, $MoO_3$ or $WO_3$ nanorods/nanoplatelets/nanowires in a core-shell configuration, according to an embodiment of the present invention.

FIGS. 4A-B are illustrative schematics of an anticipated composite of a hexagonal ZnS shell around hexagonal $MoS_2$ or $WS_2$ core structure of a solid lubricant, according to an embodiment of the present invention.

DETAILED DESCRIPTION OF THE EMBODIMENTS

Figure 2B:
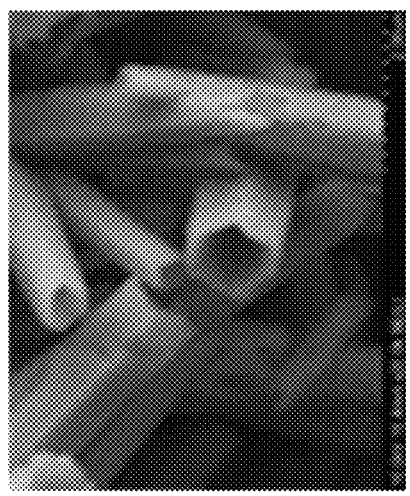
FIGS. 2A-C are SEM images of hollow hexagonal nanotubes of ZnO made by refluxing a mixture of zinc nitrate and urea at 110° C. for 35 min., according to an embodiment of the present invention.

Certain solids such as zinc sulfide (ZnS), or transition metal chalcogenides, such as molybdenum disulfide ($MoS_2$), and tungsten disulfide ($WS_2$), along with Teflon and graphite flakes, are excellent lubricants with exceptionally low friction coefficient. Further, these lubricants are increasingly used to minimize the maintenance costs. The low friction coefficient of these lubricants is due to low interplanar shear strength, and in some cases, low hardness.

The lubricating behavior of transition metal chalcogenides, such as ZnS, $MoS_2$ and $WS_2$, stems from their interlayer mechanical weakness that is intrinsic to their sheet-like two-dimensional (2D) crystal structure. Interestingly, the three lubricant sulfides described herein are isostructural. The wurtzite form of ZnS has a hexagonal unit cell with a=3.25 Å and c=5.2 Å (c/a ratio~1.60, close to the ideal c/a=1.633 value for hexagonal cell). $MoS_2$ and $WS_2$ also crystallize in hexagonal structure where a sheet of Mo (or W) atoms is sandwiched between every two layers of hexagonally packed sulfur atoms (S-M-S . . . S-M-S . . . S-M-S S-M-S) with a high c/a ratio (a=3.16 Å, c=12.29 Å for $MoS_2$ and a=3.16 Å, c=18.50 Å for $WS_2$). The relative value of their respective a parameter (slightly higher in the case of ZnS than that of $MoS_2$ and $WS_2$) indicates that both $MoS_2$ and $WS_2$ could be easily accommodated within ZnS, if the latter could be produced in a hollow hexagonal motif. Such a core-shell configuration could augment interlamellar shearing, leading to better interplanar slip in the composite.

Some embodiments generally pertain to developing chalcogenide nanocomposites under mild and benign experimental conditions from simple and readily available chemicals, without resorting to the use of exotic, pricey and bulky precursors.

FIG. 1 is a flow diagram illustrating a process 100 for creating solid lubricants for space mechanisms, according to an embodiment of the present invention. In some embodiments, the process begins at 102 with the synthesis of two-dimensional (2D) $MoO_3$ and $WO_3$ nanoplatelets/nanowires. At 104, pristine hexagonal hollow ZnO nanotubes are prepared, and at 106, 3D hexagonal hollow ZnO nanotubes (shell) around the 2D $MoO_3$ and $WO_3$ nanoplatelets/nanowires (core) are prepared. At 108, sulfidation of the core-shell under mild condition via vapor phase transport at approximately 400-450° C. is conducted, wherein hexagonal $MoS_2$ and $WS_2$ platelets/nanowires are formed and embedded within the hollow ZnS hexagons. At 110, the intended composite solid lubricant structure is created with anticipated amelioration in its efficacy to lower the coefficient of friction and enhance the antiwear aspect of various space mechanisms such as actuators, motors, gimbals, etc.

Synthesis of 2D $MoO_3$ Platelets

An example of synthesizing 2D $MoO_3$ platelets is described below. For example, small coupons are cut from a molybdenum (Mo) foil and heated in static air at 600° C. for approximately two hour. Due to large volume change (e.g., going from metal to metal oxide), the metal coupons disintegrate into small debris. Scanning electron microscopy (SEM) imaging and X-ray diffraction (XRD) is performed to discern for morphological changes and confirm the formation of $MoO_3$ phase. The debris is heated for 1 hour at 450° C. in a gas mixture containing 1 percent of CO in $N_2$, followed by natural cooling in air. SEM and XRD indicate the formation of very thin and sharp 2D platelets of $MoO_3$.

Synthesis of 2D $MoO_3$ Nanorods and/or Nanoplates

In one example, 2D $MoO_3$ nanorods and/or nanoplates are synthesized by the reduction of peroxymolybdic solution with hexamethylenetetramine (HMTA). The peroxomolybdic solution is prepared by dissolving Mo powder in hydrogen peroxide ($H_2O_2$) under vigorous stirring. HMTA solutions of varying molarity are prepared to study the influence of HMTA strength on the morphology of the resulting $MoO_3$ particles. HMTA solution is slowly added to the peroxomolybdic solution under constant stirring, when a precipitate is formed. The precipitate is separated by a centrifuge, and dried at 70° C.

In another example, ammonium molybdate is dissolved in DI water, followed by the addition of urea (20 wt. %) and sonicated in a water bath maintained at 65-70° C. The pH is adjusted to ~3.0 by adding nitric acid while sonicating. The precipitate is collected by the centrifuge and dried at 70° C.

Synthesis of 3D $WO_3$ Nanobundles/Nanoribbons/Nanowires

In one example, small coupons are cut from a tungsten (W) foil and heated in static air for 2 hour at 800° C. Due to large volume change (e.g., going from metal to metal oxide), the metal coupons disintegrate into small debris. SEM and XRD is performed to discern for morphological changes and confirm the formation of $WO_3$. In another example, W foil is heated for 2 hour at 800° C. in different $CO/CO_2$ buffer mixtures and SEM and XRD is performed on the resulting product.

In yet another example, 6M HCl is added drop wise to 100 mL of a 15 mM solution of $Na_2WO_4 \cdot 2H_2O$ is cooled to a temperature of 5-10° C., and stirred constantly. The suspension is centrifuged, washed repeatedly to attain a pH of ~6 and is poured into 200-300 mL DI water and ultrasonicated for 2 hour. It is aged for 24 to 48 hour at room temperature for crystallization.

In yet another example, 2M HCl is added drop wise to 20 mL $Na_2WO_4 \cdot 2H_2O$ solution under constant stirring until a pale yellow precipitate is formed. The precipitate is transferred to 60 mL of 2M HCl and stirred continuously for 24 hour, followed by aging for 96 hour at 80° C. The precipitate is filtered, washed with DI water several times, and calcined at 500° C. for 2 hour in air (e.g., heating rate: 5° C./min)

Synthesis of Hollow Hexagonal ZnO Nanorods

Figure 2C:
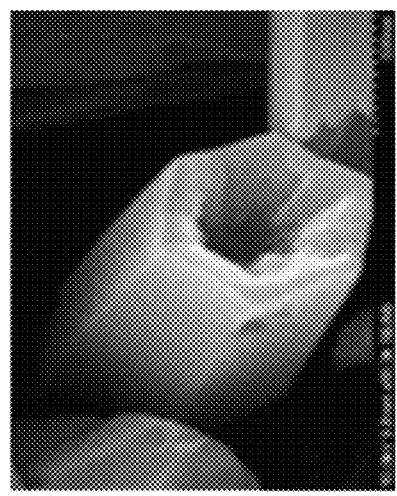
Figure 2A:
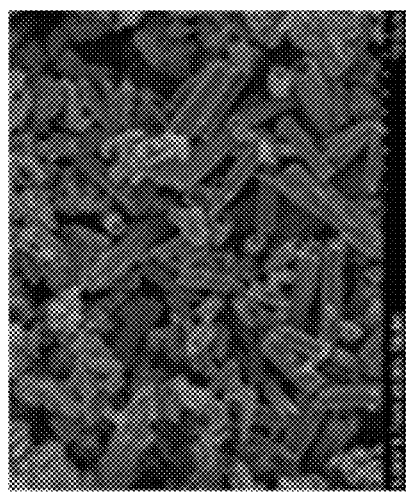

Following is an embodiment of the procedure for synthesizing hollow hexagonal ZnO nanorods. For example, 0.17 M urea solution is made by dissolving 4.9 g urea in 480 ml DI water. It is heated, allowed to come to near boiling and refluxed for approximately 20 min. at 110° C. 1.1 M solution of zinc nitrate (3.27 g dissolved in 20 ml DI water) is added to the refluxing urea solution, and the mixture (e.g., the combination of the zinc nitrate solution and the refluxing urea solution) is boiled for additional 15 min. In some embodiments, the mixture is allowed to boil for 20 to 25 min. instead of 15 min., after adding zinc nitrate solution. The resulting mixture is rapidly cooled and the precipitate is collected by a centrifuge and dried. See, for example, FIGS. 2A-C, which are SEM images (200A-C) of hollow hexagonal ZnO made by refluxing zinc nitrate-urea mixture at 110° C. for 35 min, according to an embodiment of the present invention.

Synthesis of Hollow Hexagonal ZnO Nanorods Around $MoO_3$/$WO_3$ Platelets and/or Nanorods The following discussion is an embodiment of the present invention for the synthesis of 3D hollow hexagonal ZnO nanorods around 2D $MoO_3$/$WO_3$ platelets and/or 3D nanorods. For example, 0.17 M urea solution is made by dissolving 4.9 g urea in 480 ml DI water. $MoO_3$ platelets/nanorods or $WO_3$ nanobundles/nanoplates prepared by the processes described above under the sections "SYNTHESIS OF 2D $MoO_3$ PLATELETS" and "SYNTHESIS OF 3D $WO_3$ NANOBUNDLES/NANORIBBONS/NANOWIRES" may be added to the urea solution being refluxed for approximately 20 min near boiling. 1.1 M solution of zinc nitrate made by dissolving 3.27 g zinc nitrate hexahydrate in 20 ml of DI water is added to the refluxing solution (i.e., the urea solution), and the entire mixture may be boiled for additional 15 min. In some embodiments, the entire mixture is boiled for 20 to 25 min. instead of 15 min. The resulting mixture is rapidly cooled and the precipitate is collected by a centrifuge and dried. Growth of hollow ZnO nanorods around $MoO_3$ and/or $WO_3$ platelets or nanowires or nanorods entrapped within them may be confirmed by SEM and TEM (transmission electron microscopy).

FIGS. 3A-B illustrate the schematics 300A-B of the anticipated structure of the ZnO/$MoO_3$ or ZnO/$WO_3$ composite resulting from the aforementioned procedure, according to an embodiment of the present invention. In this embodiment, hollow ZnO nanotubes 302 grow from aqueous solution around the nanoplatelets, nanowires or nanorods of $MoO_3$ and/or $WO_3$ 304.

Synthesis of $ZnS$—$XS_2$ Composite in Shell-Core Configuration

The following discussion is an embodiment for the synthesis of $ZnS$—$XS_2$ composites in shell-core configuration by subjection the $ZnO$—$XO_3$ composite (where X=Mo or W) made by a procedure discussed above with respect to FIGS. 3A-C, by a co-sulfidation step described in the following. In some embodiments, the $ZnO$—$XO_3$ shell-core composite is placed in a porcelain/ceramic boat which is wrapped in a perforated Al-foil. The boat is placed in a horizontal furnace and heated at 200° C. for 2 hour in dry $N_2$ at small flow rate in order to expel remnant air from the furnace interior and replace with an inert non-reacting ambient, prior to sulfidation. In one embodiment, a bubbler containing an aqueous ammonium sulfide solution (($NH_4)_2S$, 0.1 M) is placed between a compressed $N_2$ gas cylinder and the furnace. One end of a bubbler containing aqueous $(NH_4)_2S$ solution (0.1 M) is attached to the nitrogen bottle, while the other end is connected to the tube in the furnace that contains the boat. With $N_2$ bubbling through the aqueous sulfide solution, the furnace temperature may be increased to 400° C. and held at 400° C. for 4 hour to ensure completion of the process of sulfidation of the contents of the boat via gas phase transport of the sulfiding agent, $(NH_4)_2S$. The furnace is turned off and allowed to cool to ambient temperature in $N_2$ flow. The sample is extracted from the boat and characterized by XRD, SEM, and TEM.

Figure 4B:
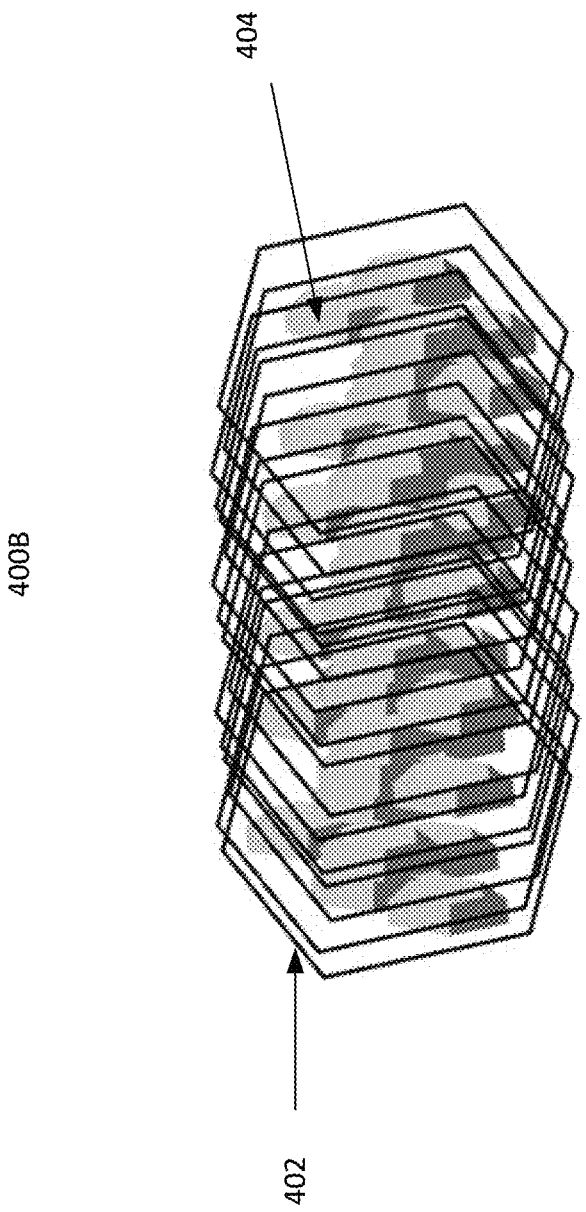

FIGS. 4A-B illustrate the schematics 400A-B of the anticipated structure of the $ZnS/MoS_2$ or $ZnS/WS_2$ composite solid lubricant resulting from the aforementioned procedure, according to an embodiment of the present invention. Hollow ZnO nanorods transform into corresponding ZnS 402, retaining their hexagonal structure, while the embedded $MoO_3$ and/or $WO_3$ nanoplatelets and nanowires 404 upon sulfidation are converted into corresponding sulfides (also hexagonal) and stay lodged within the ZnS cage.

It will be readily understood by those skilled in the art that the components of various embodiments of the present invention, as generally described and illustrated in the figures herein, may be arranged and designed in a wide variety of different configurations. Thus, the detailed description of the embodiments, as represented in the attached figures, do not limit the scope of the invention as claimed, but is merely a representative of the selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, the appearance of the phrases "in certain embodiments," "in some embodiment," "in other embodiments," or similar language throughout this specification do not necessarily all refer to the same group of embodiments and, the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, the discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A process for producing solid lubricants, comprising:
    synthesizing three-dimensional (3D) nanoplatelets, nanorods, or nanowires of $MoO_3$ and $WO_3$;
    creating hollow hexagonal ZnO nanotubes by refluxing a mixture of zinc nitrate and urea at a predefined temperature or a range of temperatures for a predefined period or periods of time;
    growing the hollow hexagonal ZnO nanotubes around platelets, nanorods, or nanowires of the $MoO_3$ or $WO_3$; and
    sulfidation of the hexagonal ZnO nanotubes, and the platelets, nanorods, or nanowires of the $MoO_3$ or $WO_3$, creating a solid lubricant in a core-shell configuration from the hollow hexagonal ZnS nanotubes with an embedded hexagonal core of $MoS_2$ or $WS_2$.

2. The process of claim 1, wherein the creating of the hollow hexagonal ZnO nanotubes comprises:
    dissolving urea in deionized water to make urea solution.

3. The process of claim 2, wherein the creating of the hollow hexagonal ZnO nanotubes comprises:
    heating the urea solution to near boiling point, such that the urea solution begins to reflux.

4. The process of claim 3, wherein the creating of the hollow hexagonal ZnO nanotubes comprises:
    adding a zinc nitrate solution to the refluxing urea solution and boiling a mixture of the zinc nitrate solution and the refluxed urea solution for a predefined period of time.

5. The process of claim 4, wherein the creating of the hollow hexagonal ZnO nanotubes comprises:
    rapidly cooling the mixture resulting from the boiling, and collecting a precipitate from the resulting mixture by a centrifuge and drying the precipitate.

6. The process of claim 1, wherein the growing of the hollow hexagonal ZnO nanotubes around platelets, nanorods, or nanowires of the $MoO_3$ or $WO_3$ comprises:
    dissolving urea in deionized water to make urea solution.

7. The process of claim 6, wherein the growing of the hollow hexagonal ZnO nanotubes around platelets, nanorods, or nanowires of the $MoO_3$ or $WO_3$ comprises:

adding platelets or nanorods of $MoO_3$ or nanobundles or nanoplates of $WO_3$ to the urea solution being refluxed for a predefined period of time.

8. The process of claim 7, wherein the growing of the hollow hexagonal ZnO nanotubes around platelets, nanorods, or nanowires of the $MoO_3$ or $WO_3$ comprises:

adding zinc nitrate solution to the refluxing urea solution and boiling a mixture of the zinc nitrate solution and the refluxing urea solution for a predefined period of time.

9. The process of claim 8, wherein the growing of the hollow hexagonal ZnO nanotubes around platelets, nanorods, or nanowires of the $MoO_3$ or $WO_3$ comprises:

rapidly cooling the mixture resulting from the boiling, and collecting a precipitate from the resulting mixture by a centrifuge and drying the precipitate.

10. The process of claim 1, wherein the creating of the solid lubricant in a core-shell configuration comprises:

placing the core-shell configuration in a porcelain or ceramic boat wrapped in a perforated aluminum foil.

11. The process of claim 10, wherein the creating of the solid lubricant in a core-shell configuration comprises:

heating the porcelain or ceramic boat in a horizontal furnace for a predefined period of time and at a predefined temperature.

12. The process of claim 11, wherein the heating of the porcelain or ceramic boat further comprises:

replacing the remnant air with inert non-reacting ambient air prior to sulfidation by controlling the flow rate of $N_2$ within the horizontal furnace to expel remnant air from inside of the horizontal furnace.

13. The process of claim 12, wherein the heating of the porcelain or ceramic boat further comprises:

increasing temperature of the horizontal furnace to a predefined temperature and holding the temperature constant for a predefined period of time to ensure completion of the sulfidation.

14. The process of claim 13, wherein the heating of the porcelain or ceramic boat further comprises:

extracting a sample from the boat after the sulfidation is complete.

\* \* \* \* \*